(12) United States Patent
Shen et al.

(10) Patent No.: US 11,082,522 B2
(45) Date of Patent: Aug. 3, 2021

(54) INFORMATION ACQUISITION

(71) Applicant: NEW H3C TECHNOLOGIES CO., LTD., Hangzhou (CN)

(72) Inventors: Zhipeng Shen, Beijing (CN); Hai Wang, Beijing (CN)

(73) Assignee: NEW H3C TECHNOLOGIES CO., LTD., Hangzhou (CN)

(*) Notice: Subject to any disclaimer, the term of this patent is extended or adjusted under 35 U.S.C. 154(b) by 175 days.

(21) Appl. No.: 16/343,857

(22) PCT Filed: Oct. 23, 2017

(86) PCT No.: PCT/CN2017/107299
§ 371 (c)(1),
(2) Date: Apr. 22, 2019

(87) PCT Pub. No.: WO2018/077132
PCT Pub. Date: May 3, 2018

(65) Prior Publication Data
US 2019/0268437 A1 Aug. 29, 2019

(30) Foreign Application Priority Data

Oct. 25, 2016 (CN) .......................... 201610940380.6

(51) Int. Cl.
G06F 15/167 (2006.01)
H04L 29/08 (2006.01)
G06F 9/455 (2018.01)

(52) U.S. Cl.
CPC ...... H04L 67/2885 (2013.01); G06F 9/45558 (2013.01); H04L 29/08 (2013.01);
(Continued)

(58) Field of Classification Search
CPC .................. H04L 63/1408; H04L 41/0803
(Continued)

(56) References Cited

U.S. PATENT DOCUMENTS

2007/0055957 A1 3/2007 Birenheide et al.
2013/0346470 A1 12/2013 Obstfeld et al.
(Continued)

FOREIGN PATENT DOCUMENTS

CN 102035884 4/2011
CN 102096596 6/2011
(Continued)

OTHER PUBLICATIONS

International Search Report and Written Opinion issued in International Patent Application No. PCT/CN2017/107299, dated Jan. 19, 2018.
(Continued)

*Primary Examiner* — Wing F Chan
*Assistant Examiner* — Andrew Woo
(74) *Attorney, Agent, or Firm* — Norton Rose Fulbright US LLP

(57) ABSTRACT

Disclosed is a method comprising: receiving an information acquiring request sent by a first virtual machine, wherein the information request contains an identifier of the first virtual machine; detecting whether locally cached configuration information contains first configuration information corresponding to the identifier of the first virtual machine; if so, locally acquiring the first configuration information and sending the first configuration information to the first virtual machine; otherwise, adding primary information to the information acquiring request, and sending the information acquiring request with the added primary information to a secondary proxy server sending, configuration information of all virtual machines corresponding to the secondary proxy server being cached in the secondary proxy server; receiving the first configuration information fed back by the secondary proxy server according to the identifier of the first virtual machine and the primary information; caching the received (Continued)

first configuration information and sending it to the first virtual machine.

14 Claims, 5 Drawing Sheets

(52) U.S. Cl.
CPC ...... *H04L 67/2842* (2013.01); *G06F 9/45533* (2013.01); *G06F 2009/45583* (2013.01); *G06F 2009/45595* (2013.01)

(58) Field of Classification Search
USPC .................................................. 709/212, 213
See application file for complete search history.

(56) References Cited

U.S. PATENT DOCUMENTS

| 2014/0195666 | A1* | 7/2014 | Dumitriu | ................ | H04L 49/70 709/223 |
| 2016/0337464 | A1* | 11/2016 | Eriksson | ................ | H04L 67/42 |

FOREIGN PATENT DOCUMENTS

| CN | 102594914 | 7/2012 |
| CN | 104202364 | 12/2014 |
| CN | 104539743 | 4/2015 |
| JP | 2016006608 | 1/2016 |
| WO | WO 2015088416 | 6/2015 |

OTHER PUBLICATIONS

Liu et al., "Metadata Service Mechanism of OpenStack" Sep. 17, 2015, accessed from the internet URL: < https://ibm.com/developerworks/cn/cloud/library/1509-liukg-openstackmeta/ > (English Translation not Available).

Office Action issued in Corresponding Japanese Application No. 2019-521709, dated Jul. 7, 2020 (English Translation provided).

"OpenStack Object Storage Administrator Manual" Jun. 2, 2011, retrieved from URL:http//web.archive.org/web/20110727190919/http://docs.openstack.org/cactus/openstack-object-storage/admin/os-objectstorage-adminguide-cactus.pdf on Aug. 12, 2015.

Extended European Search Report issued in counterpart European Application No. 17865562.7, dated Oct. 16, 2019.

Kaige et al., "OpenStack's metadata service mechanism" retrieved from URL:https//www.ibm.com/developerworks/cn/cloud/library/1509_liukg_openstackmeta/ on Oct. 4, 2019.

Liu et al., "R-Memcached: A Reliable In-Memory Cache System for Big Key-Value Stores" 2015, International Conference on Computer Analysis of Images and Patterns. CAIP 2017: Computer Analysis of Images and Patterns, Springer, pp. 243-256.

Office Action issued in counterpart Chinese Application No. 201610940380.6, dated Sep. 4, 2019 (No translation available).

\* cited by examiner

INFORMATION ACQUISITION

CROSS-REFERENCE TO RELATED APPLICATIONS

The present application is a national phase under 35 U.S.C. § 371 of International Application No. PCT/CN2017/107299, filed Oct. 23, 2017, which claims priority to Chinese Patent Application No. 201610940380.6, filed with the China National Intellectual Property Administration on Oct. 25, 2016 entitled "Information Acquiring Method and Device", the content contents of each of which are incorporated herein by reference in their entirety.

BACKGROUND

With the development of information technology, the application of cloud platform technology becomes wider and wider. Creating multiple virtual machines in a cloud platform may effectively improve the performance, such as stability, reliability, efficiency, of the cloud platform.

A virtual machine may be configured when being created. The configuration information may include application software information, SSH (Secure Shell) keys, host name, and so on.

DETAILED DESCRIPTION

The technical solution in the examples of the present disclosure will be described below in conjunction with the accompanying drawings in the examples of the present disclosure, and it is apparent that the described examples are only part of the examples of the present disclosure rather than all of the examples. Based on the examples of the present disclosure, all other examples acquired by those of ordinary skill in the art without doing creative work fall within the protection scope of the present disclosure.

In the Cloud platform OpenStack, configuration information of a virtual machine is stored in an interface server, such as an API (Application Programming Interface) server. The virtual machine acquires the configuration information from the API server, the specific process of the virtual machine acquiring the configuration information from the API server includes:

1. the virtual machine sends an information acquiring request for the configuration information to a primary proxy server, such as a Proxy server;

2. the Proxy server adds primary information such as an intermediate node identifier and a network identifier to the information acquiring request, and sends the information acquiring request with the added primary information to a secondary proxy server, such as an Agent server;

3. the Agent server adds secondary information such as a virtual machine identifier and a tenant identifier to the received information acquiring request, and sends the information acquiring request with the added secondary information to the API server;

4. the API server extracts information such as the intermediate node identifier, the network identifier, the virtual machine identifier and the tenant identifier from the received information acquiring request, and acquires corresponding configuration information according to the extracted information, and sends the configuration information to the virtual machine.

Based on the above, if a virtual machine needs to acquire configuration information, a long path needs to be gone through, which will consume too many system resources.

The present disclosure will be described below in detail with reference to specific examples.

Figure 1:
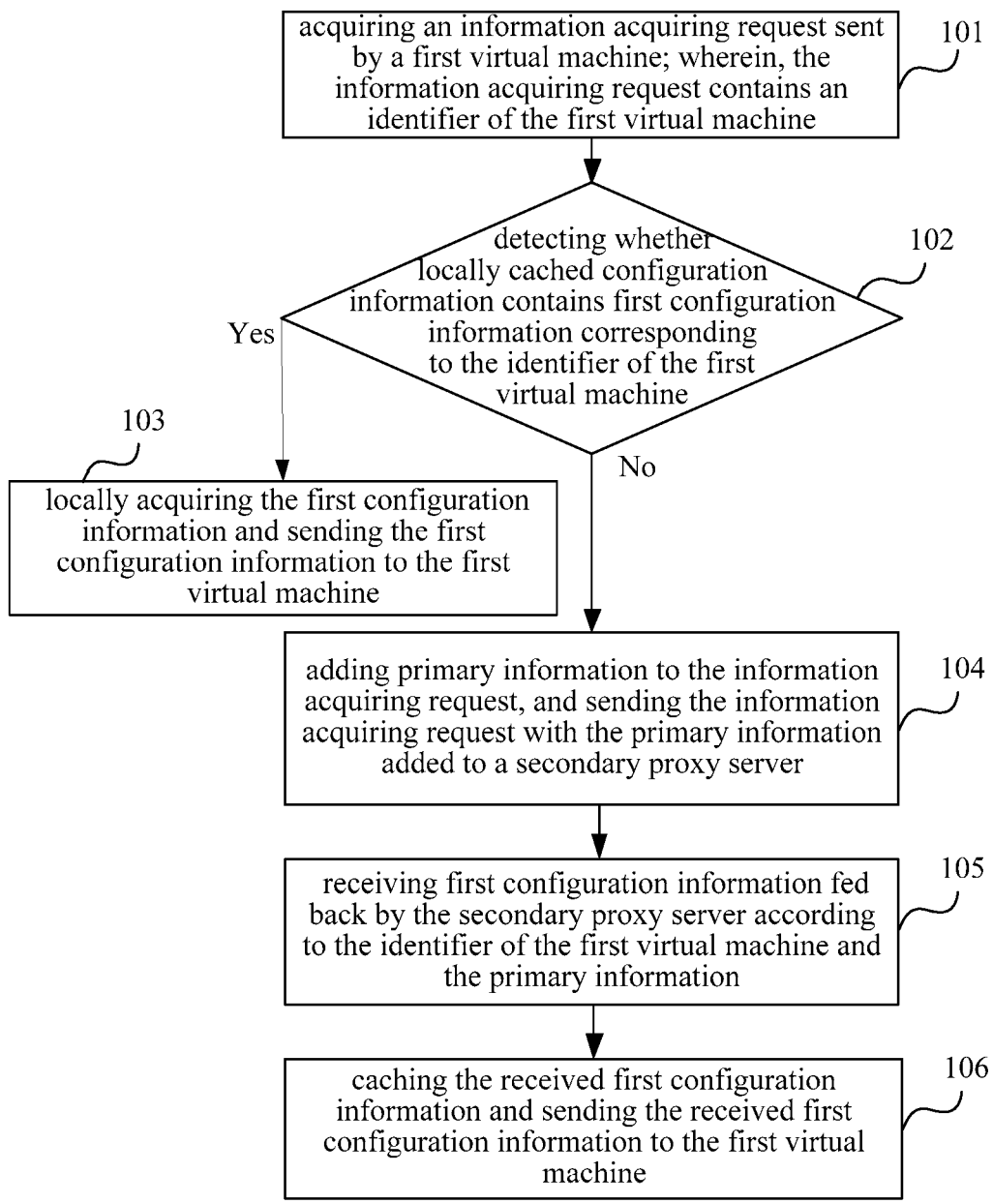
FIG. 1 is a schematic flowchart of an information acquiring method provided by an example of the present disclosure.

Referring to FIG. 1, FIG. 1 is a schematic flowchart of an information acquiring method provided by an example of the present disclosure, which is applicable to a primary proxy server. The method may comprise the following:

101: acquiring an information acquiring request sent by a first virtual machine; wherein, the information acquiring request contains an identifier of the first virtual machine.

The first virtual machine may be any virtual machine in a cloud platform.

OpenStack is one of cloud platforms. In OpenStack, if the first virtual machine needs to acquire configuration information, OpenStack may import the information acquiring request sent by the first virtual machine into a network namespace, thereby send the information acquiring request to a primary proxy server.

In OpenStack, the primary proxy server may be neutron-ns-proxy. In general, OpenStack may be provided with one network node and multiple computing nodes. OpenStack planning may be divided into centralized planning and distributed planning; in the centralized planning, neutron-ns-proxy may run on the network node of OpenStack, and in the distributed planning, neutron-ns-proxy may also run on the computing nodes of OpenStack.

102: detecting whether locally cached configuration information contains first configuration information corresponding to the identifier of the first virtual machine; if so, executing 103; if not, executing 104.

In an example, the identifier of the first virtual machine may be the IP (Internet Protocol) address of the first virtual machine. The primary proxy server may pre-cache the corresponding relation between configuration information of the virtual machine and an IP address of the virtual machine. In this case, after receiving the information acquiring request, the primary proxy server may resolve the information acquiring request, acquire the source IP address from the information acquiring request, detect whether the configuration information corresponding to the source IP address is locally cached, if so, it is determined that the locally cached configuration information contains the first configuration information corresponding to the identifier of the first virtual machine.

103: locally acquiring the first configuration information and sending the first configuration information to the first virtual machine.

As described in 102, when it is determined that the first configuration information corresponding to the source IP address is locally cached, the first configuration information corresponding to the source IP address may be locally acquired according to the source IP address, and the first configuration information is sent to the first virtual machine.

Based on the above, the path for requesting configuration information by a virtual machine is cut off at the primary proxy server, which reduces system resources consumed when the virtual machine acquires configuration information. In addition, it is not needed to send the information acquiring request to an interface server, which correspondingly does not need to respond to the information acquiring request, thereby reducing the burden of the CPU (Central Processing Unit) of the interface server and improving the security and reliability of the cloud platform.

In OpenStack, the interface server may be nova-API.

104: adding primary information to the information acquiring request, and sending the information acquiring request with the added primary information to a secondary proxy server.

In an example, the primary information may include an intermediate node identifier and a network identifier, etc., which are the same as those in the prior art and will not be described repeatedly in the present disclosure; configuration information of virtual machines, e.g., configuration information of all virtual machines, corresponding to the secondary proxy server, is cached in the secondary proxy server.

In OpenStack, the secondary proxy server may be a neutron-agent. In the centralized planning, the neutron-agent may run on a network node of OpenStack, where all virtual machines corresponding to the neutron-agent (i.e., all virtual machines corresponding to the secondary proxy server) are all virtual machines in the OpenStack; in the distributed planning, the neutron-agent may run on the computing nodes of the OpenStack, where all virtual machines corresponding to the secondary proxy server are all virtual machines inside the computing node where the neutron-agent is located.

105: receiving first configuration information fed back by the secondary proxy server according to the identifier of the first virtual machine and the primary information.

In general, after receiving the information acquiring request with the added primary information, the secondary proxy server may resolve and acquire the primary information and the identifier of the first virtual machine from the information acquiring request, thus determine the secondary information according to the primary information and the identifier of the first virtual machine, and acquire the corresponding first configuration information locally according to the primary information, the identifier of the first virtual machine and the secondary information.

106: caching the received first configuration information and sending the received first configuration information to the first virtual machine.

After acquiring the corresponding first configuration information locally, the secondary proxy server sends the acquired first configuration information to the primary proxy server, which in turn sends the first configuration information to the first virtual machine.

In this case, the path for acquiring configuration information by a virtual machine is cut off at the secondary proxy server, and does not arrive at an interface server, which reduces the system resources consumed when a virtual machine acquires configuration information. In addition, it is not needed to send the information acquiring request to an interface server, which correspondingly does not need to respond to the information acquiring request, thereby reducing the CPU burden of the interface server and improving the security and reliability of the cloud platform.

In addition, the primary proxy server caches the first configuration information sent by the secondary proxy server. Thus, when the first virtual machine requests the first configuration information again, the primary proxy server may respond to the information acquiring request, reducing the system resources consumed by the virtual machine when acquiring the configuration information.

Figure 2:
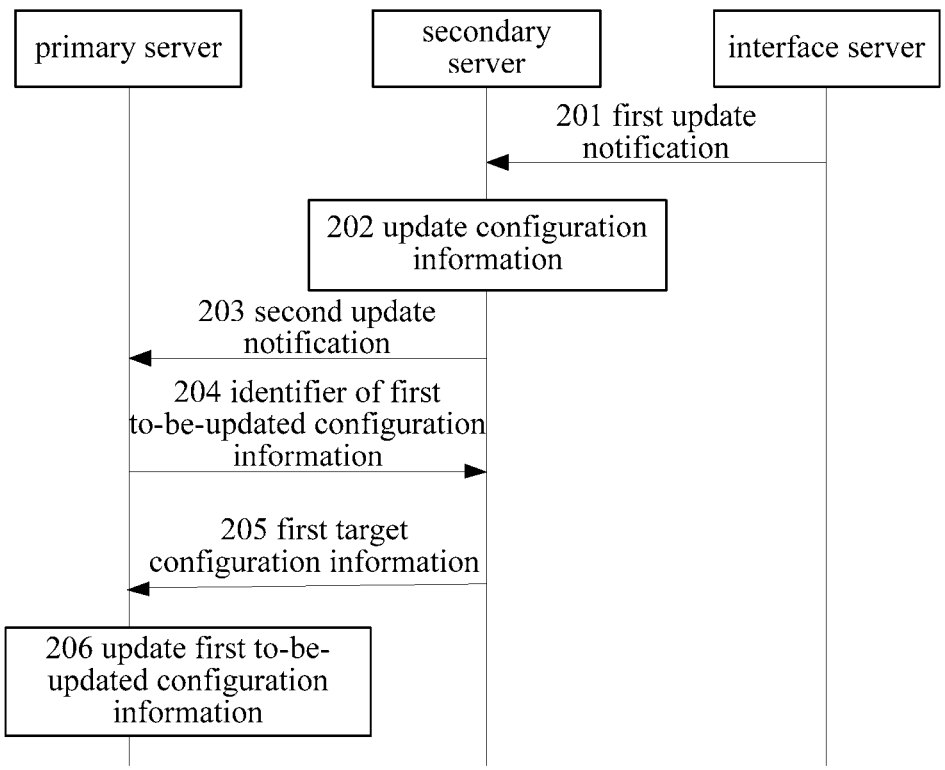
FIG. 2 is a schematic flowchart of updating configuration information provided by an example of the present disclosure.

In a cloud platform, as a virtual machine is created, updated, and deleted, the configuration information in an interface server changes. In an example, as shown in FIG. 2, the following procedure may be used to update the configuration information:

201: when configuration information in an interface server changes, the interface server may send, to the secondary proxy server, a first update notification for updating the configuration information cached in the secondary proxy server.

202: after receiving the first update notification sent by the interface server, the secondary proxy server updates the configuration information according to the first update notification.

203: in order to ensure that the configuration information in the primary proxy server is accurate and reliable, when the configuration information cached in the secondary proxy server changes, i.e., after the secondary proxy server receives the first update notification sent by the interface server and updates the configuration information according to the first update notification, the secondary proxy server may send a second update notification to the primary proxy server.

204: the primary proxy server determines first to-be-updated configuration information according to the second update notification and sends an identifier of the first to-be-updated configuration information to the secondary proxy server.

205: the secondary proxy server acquires first target configuration information corresponding to the identifier of the first to-be-updated configuration information locally according to the identifier of the first to-be-updated configuration information and feeds the first target configuration information back to the primary proxy server.

206: after receiving the first target configuration information which is fed back by the secondary proxy server, the primary proxy server may update the local first to-be-updated configuration information with the first target configuration information fed back by the secondary proxy server.

In the example shown in FIG. 2, the first to-be-updated configuration information cached in the primary proxy server is the configuration information that needs to be updated, the first target configuration information cached in the secondary proxy server is the same as the identifier of the first to-be-updated configuration information, but they are different in content, the former is used for updating the first to-be-updated configuration information.

In an example, the second update notification may include an identifier of the second target configuration information, wherein the second target configuration information may be understood as configuration information that has changed in the secondary proxy server; the second update notification may not include the identifier of the second target configuration information. Based on this, determining the first to-be-updated configuration information according to the second update notification may include:

if the second update notification does not carry the identifier of the second target configuration information, the primary proxy server may determine all the locally cached configuration information as the first to-be-updated configuration information;

if the second update notification carries the identifier of the second target configuration information, the primary proxy server may determine the locally cached configuration information corresponding to the identifier of the second target configuration information as the first to-be-updated configuration information.

In an example, the identifier of the second target configuration information may include a file name of the second target configuration information. For example, the configuration information whose file name is A, B and C respectively is cached in the primary proxy server, if the second update notification received by the primary proxy server does not carry the identifier of the second target configuration information, the primary proxy server may determine all the locally cached configuration information as the first to-be-updated configuration information, and send the identifier of the first to-be-updated configuration information to the secondary proxy server, i.e., the file names A, B, C are sent to the secondary proxy server, thus the first target configuration information with file names A, B, C is acquired from the secondary proxy server and updated;

if the second update notification received by the primary proxy server carries the file names A, B, C of the second target configuration information. Based on the locally cached configuration information whose file name is A, B, C respectively, the configuration information with file names A, B may be determined as the first to-be-updated configuration information, and send the identifier of the first to-be-updated configuration information to the secondary proxy server, i.e., the file names A, B are sent to the secondary proxy server, thus the first target configuration information with file names A, B is acquired from the secondary proxy server and updated.

In an example, the identifier of the second target configuration information may include an identifier of a second virtual machine. In this case, the determined first to-be-updated configuration information is the configuration information corresponding to the identifier of the second virtual machine. In addition, the identifier of the second target configuration information may also include an identifier of the second virtual machine and a file name of the second target configuration information, in this case, the determined first to-be-updated configuration information is: locally cached configuration information, which corresponds to the identifier of the second virtual machine and whose file name is the file name of the second target configuration information.

For example, there is configuration information cached in the primary proxy server, whose file name is A, B, and C respectively for a second virtual machine 1. If the identifier of the second target configuration information carried in the second update notification received by the primary proxy server is an identifier "1" of the second virtual machine 1 and an identifier "2" of the second virtual machine 2, in conjunction with the locally cached configuration information, it can be determined that the first to-be-updated configuration information is configuration information for the second virtual machine 1, and the identifier of the first to-be-updated configuration information is sent to the secondary proxy server, i.e., the identifier "1" of the second virtual machine 1 is sent to the secondary proxy server, thus all configuration information for the second virtual machine 1 is acquired from the secondary proxy server, i.e., the first target configuration information is acquired and updated.

If the identifier of the second target configuration information carried in the second update notification received by the primary proxy server is: [identifier "1" of the second virtual machine 1, file names A, B of the configuration information], [identifier "2" of the second virtual machine 2, file name D of the configuration information], in conjunction with the locally cached configuration information, it can be determined that the first to-be-updated configuration information is configuration information whose file name is A, B respectively for the second virtual machine 1, and the identifier of the first to-be-updated configuration information is sent to the secondary proxy server, i.e., [identifier "1" of the second virtual machine 1, file names A, B] is sent to the secondary proxy server, thus the first target configuration information with file name A for the second virtual machine 1 and the first target configuration information with file name B for the second virtual machine 1 are acquired from the secondary proxy server and updated.

The second virtual machine may be any virtual machine in a cloud platform, and may be identical with or different from the first virtual machine.

In another example, when the configuration information in an interface server changes, the interface server sends a first update notification to the secondary proxy server to update the cached configuration information in the secondary proxy server. In this case, in order to ensure that the configuration information in the primary proxy server is accurate and reliable, the secondary proxy server may pre-store the corresponding relation between a proxy server and configuration information. When the cached configuration information in the secondary proxy server changes, i.e., when the secondary proxy server receives the first update notification sent by the interface server and updates the configuration information according to the first update notification, the secondary proxy server may determine the second target configuration information corresponding to the primary proxy server according to the pre-stored corresponding relation between a proxy server and configuration information, and send a third update notification carrying the second target configuration information to the primary proxy server. The primary proxy server, according to the received second target configuration information, determines the locally cached configuration information which corresponds to the identifier of the second target configuration information contained in the second target configuration information as second to-be-updated configuration information, and thus updates the second to-be-updated configuration information with the second target configuration information.

With the example shown in FIG. 1, the primary proxy server may cache configuration information in the process of requesting the configuration information by a virtual machine, and the secondary proxy server pre-caches the configuration information of all virtual machines corresponding to the secondary proxy server. When the primary proxy server receives the information acquiring request sent by the first virtual machine, the primary proxy server detects whether the locally cached configuration information contains first configuration information corresponding to the identifier of the first virtual machine, and if so, the first configuration information may be locally acquired and the information acquiring request may be responded with the first configuration information; if not, the information acquiring request with the added primary information is sent to the secondary proxy server; the secondary proxy server locally acquires the first configuration information according to the information acquiring request, and responds to the information acquiring request. Thus, the path for acquiring configuration information by a virtual machine is cut off at the secondary proxy server and does not arrive at the interface server, which reduces system resources consumed when the virtual machine acquires the configuration information.

Figure 3:
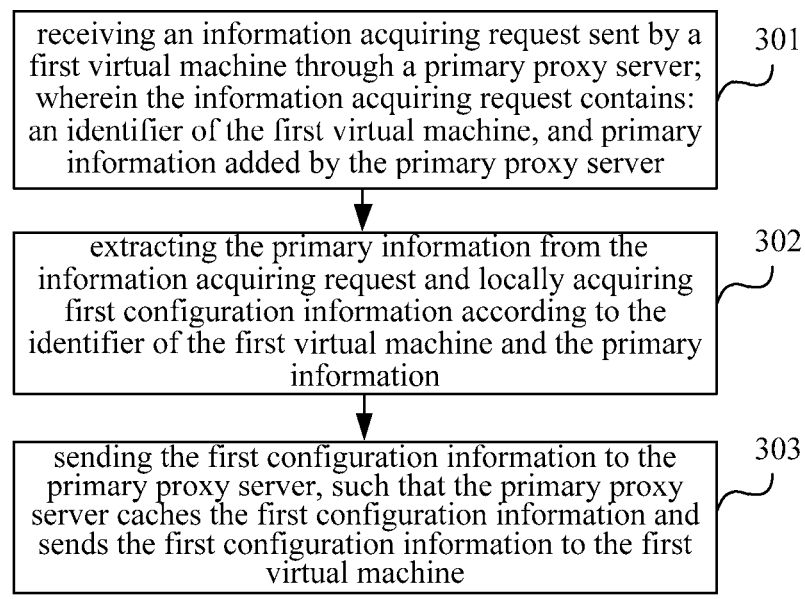
FIG. 3 is a schematic flowchart of another information acquiring method provided by an example of the present disclosure.

Referring to FIG. 3, FIG. 3 is a schematic flowchart of another information acquiring method provided by an example of the present disclosure, which is applicable to a secondary proxy server. The configuration information of the virtual machines, e.g., the configuration information of all virtual machines, corresponding to the secondary proxy server is cached in the secondary proxy server.

OpenStack is one of cloud platforms. In OpenStack, the secondary proxy server may be a neutron-agent. In general, OpenStack may be provided with one network node and multiple computing nodes. OpenStack planning may be divided into: centralized planning and distributed planning. In the centralized planning, the neutron-agent may run on a network node of OpenStack, where all virtual machines corresponding to the neutron-agent, i.e., all virtual machines corresponding to the secondary proxy server, are all virtual machines in the OpenStack; in the distributed planning, the neutron-agent may run on computing nodes of the OpenStack, and all virtual machines corresponding to the secondary proxy server are all virtual machines inside the computing node where the neutron-agent is located.

In general, the above-described information acquiring method includes:

301: receiving an information acquiring request sent by a first virtual machine through a primary proxy server; the information acquiring request comprising: an identifier of the first virtual machine and primary information added by the primary proxy server.

The primary information may include an intermediate node identifier and a network identifier, etc., which are the same as those in the prior art and will not be repeatedly described in the examples of the present example. The first virtual machine may be any virtual machine in a cloud platform, and the configuration information may be cached in the primary proxy server.

In OpenStack, the primary proxy server may be neutron-ns-proxy. In general, OpenStack may be provided with one network node and multiple computing nodes. OpenStack planning may be divided into: centralized planning and distributed planning; in the centralized planning, neutron-ns-proxy may run on a network node of OpenStack, and in the distributed planning, neutron-ns-proxy may also run on computing nodes of OpenStack.

302: extracting the primary information from the information acquiring request and locally acquiring first configuration information according to the identifier of the first virtual machine and the primary information.

In general, after receiving the information acquiring request with the added primary information, the secondary proxy server may resolve and acquire the primary information from the information acquiring request, and thus determine the secondary information according to the primary information and the identifier of the first virtual machine, and locally acquire the corresponding first configuration information according to the identifier of first virtual machine, the primary information and the secondary information.

303: sending the first configuration information to the primary proxy server, such that the primary proxy server caches the first configuration information and sends the first configuration information to the first virtual machine.

The secondary proxy server sends the acquired first configuration information to the primary proxy server, which then sends the first configuration information to the first virtual machine.

In this case, the path for acquiring configuration information by a virtual machine is cut off at the secondary proxy server, and it does not arrive at an interface server, which reduces system resources consumed when the virtual machine acquires the configuration information. In addition, it is not needed to send the information acquiring request to the interface server, which correspondingly does not need to respond to the information acquiring request, thereby reducing the CPU burden of an interface server and improving the security and reliability of a cloud platform.

In addition, the primary proxy server may cache the first configuration information sent by the secondary proxy server when receiving the first configuration information and sending the first configuration information to the first virtual machine. Thus, when the first virtual machine requests the first configuration information again, the primary proxy server may respond to the information acquiring request such that the path for requesting configuration information by a virtual machine is cut off at the primary proxy server, thereby reducing the system resources consumed when the virtual machine acquires the configuration information. In addition, it is not needed to send the information acquiring request to an interface server, which correspondingly does not need to respond to the information acquiring request, thereby reducing the CPU burden of the interface server and improving the security and reliability of the cloud platform.

Figure 4:
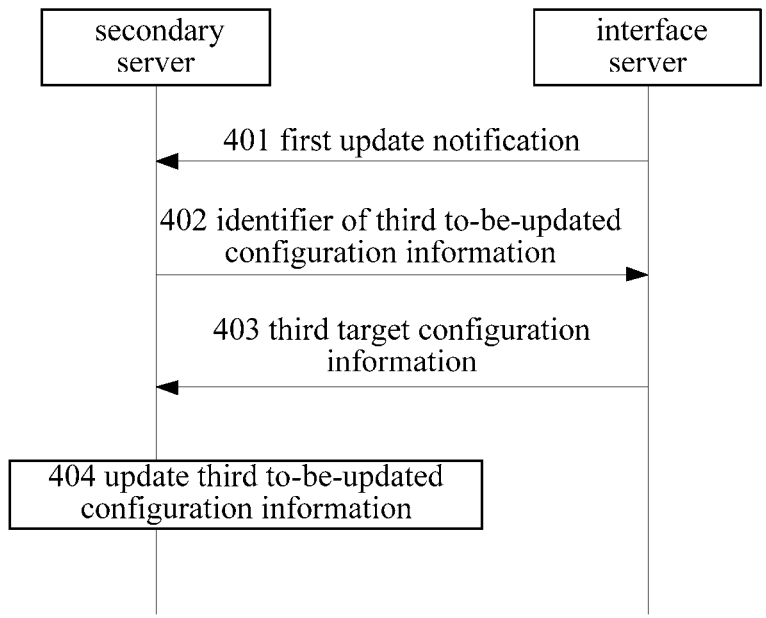
FIG. 4 is another schematic flowchart of updating configuration information provided by an example of the present disclosure.

In a cloud platform, as the virtual machine is created, updated, and deleted, the configuration information in an interface server changes. In an example, as shown in FIG. 4, the following procedure may be used to update the configuration information:

401: in order to ensure that the configuration information in the secondary proxy server is accurate and reliable, the secondary proxy server may register a listening event in the interface server, for example, register a "nava-metadata" topic, and thus, when the configuration information in the interface server changes, the interface server may send a first update notification to the secondary proxy server informing the secondary proxy server that the configuration information has changed.

402: after receiving the first update notification sent by the interface server, the secondary proxy server determines third to-be-updated configuration information, and sends an identifier of the third to-be-updated configuration information to the interface server.

403: after receiving the identifier of the third to-be-updated configuration information, the interface server may acquire third target configuration information corresponding to the identifier of the third to-be-updated configuration information according to the identifier of the third to-be-updated configuration information, i.e., the latest configuration information corresponding to the secondary proxy server, and feed the acquired third target configuration information back to the secondary proxy server.

404: after receiving the third target configuration information which is fed back by the interface server, the secondary proxy server may update the third to-be-updated configuration information with the third target configuration information fed back by the interface server. In this way, the secondary proxy server acquires the latest configuration information, and thus may provide accurate and reliable configuration information for all virtual machines corresponding to the secondary proxy server.

In the example shown in FIG. 4, the third to-be-updated configuration information cached in the secondary proxy server is the configuration information that needs to be updated, the third target configuration information cached in the interface server is the same as the identifier of the third to-be-updated configuration information, but they are different in content, the former is used for updating the third to-be-updated configuration information.

In other examples, determining the third to-be-updated configuration information according to the first update notification may include:

if the first update notification does not carry an identifier of fourth target configuration information, the secondary proxy server may determine all locally cached configuration information as the third to-be-updated configuration information;

if the first update notification carries an identifier of fourth target configuration information, the secondary proxy server may determine the locally cached configuration information corresponding to the identifier of the fourth target configuration information as the third to-be-updated configuration information.

In an example, the identifier of the fourth target configuration information may include a file name of the fourth target configuration information.

For example, the configuration information whose file name is A, B, C, D and E respectively is cached in the secondary proxy server, if the first update notification received by the secondary proxy server does not carry an identifier of the fourth target configuration information, the secondary proxy server may determine all the locally cached configuration information as the third to-be-updated configuration information, and send the identifier of the third to-be-updated configuration information to the interface server, i.e., send the file names A, B, C, D and E to the interface server, and then the third target configuration information with file names A, B, C, D and E is acquired from the interface server and updated.

If the first update notification received by the secondary proxy server carries the file names A, B, D and F of the fourth target configuration information. In conjunction with all the locally cached configuration information, the secondary proxy server may determine the configuration information with file names A, B and D as the third to-be-updated configuration information, and send the file names A, B and D to the interface server, and then the third target configuration information with file names A, B and D is acquired from the interface server and updated.

In an example, the identifier of the fourth target configuration information may include an identifier of a second virtual machine. In addition, the identifier of the fourth target configuration information may also include an identifier of a second virtual machine and a file name of the fourth target configuration information.

In an example, the configuration information in the secondary proxy server changes and the configuration information in the primary proxy server also need to be updated. In order to ensure that the configuration information in the primary proxy server is accurate and reliable, after the configuration information cached in the secondary proxy server changes, i.e., after the secondary proxy server receives the first update notification sent by the interface server and updates the configuration information according to the first update notification, the secondary proxy server may send a second update notification to the primary proxy server; the primary proxy server determines the first to-be-updated configuration information according to the second update notification, and sends the identifier of the first to-be-updated configuration information to the secondary proxy server; the secondary proxy server acquires the first target configuration information corresponding to the identifier of the first to-be-updated configuration information locally according to the identifier of the first to-be-updated configuration information and feeds the first target configuration information back to the primary proxy server. Once the primary proxy server receives the first target configuration information fed back by the secondary proxy server, the local first to-be-updated configuration information may be updated with the first target configuration information fed back by the secondary proxy server.

In other examples, determining the first to-be-updated configuration information by the primary proxy server according to the second update notification may include:

if the second update notification does not carry the identifier of the second target configuration information, the primary proxy server may determine all the locally cached configuration information as the first to-be-updated configuration information;

if the second update notification carries the identifier of the second target configuration information, the primary proxy server may determine the locally cached configuration information corresponding to the identifier of the second target configuration information as the first to-be-updated configuration information.

In another example, the configuration information in the secondary proxy server changes and the configuration information in the primary proxy server also need to be updated. In order to ensure that the configuration information in the primary proxy server is accurate and reliable, the secondary proxy server may pre-store the corresponding relation between a proxy server and configuration information. After the configuration information cached in the secondary proxy server changes, i.e., after the secondary proxy server receives first update notification sent by the interface server and updates the configuration information according to the first update notification, the secondary proxy server may determine the second target configuration information corresponding to the primary proxy server from the third target configuration information according to the pre-stored corresponding relation between a proxy server and configuration information, and send a third update notification carrying the second target configuration information to the primary proxy server. The primary proxy server, according to the received second target configuration information, determines the locally cached configuration information corresponding to the identifier of the second target configuration information contained in the second target configuration information as second to-be-updated configuration information, and thus updates the second to-be-updated configuration information with the second target configuration information.

With the example shown in FIG. 3, the primary proxy server may cache configuration information in the process of requesting the configuration information by a virtual machine, and the secondary proxy server pre-caches the configuration information of all virtual machines corresponding to the secondary proxy server. When the primary proxy server receives the information acquiring request sent by the first virtual machine, the primary proxy server detects whether the locally cached configuration information contains first configuration information corresponding to the identifier of the first virtual machine, and if so, the first configuration information may be locally acquired and the information acquiring request may be responded with the first configuration information; if not, the information acquiring request with the added primary information is sent to the secondary proxy server; the secondary proxy server locally acquires the first configuration information according to the information acquiring request, and responds to the information acquiring request. Thus, the path for acquiring configuration information by a virtual machine is cut off at the secondary proxy server and does not arrive at the interface server, which reduces system resources consumed when the virtual machine acquires the configuration information.

Figure 5:
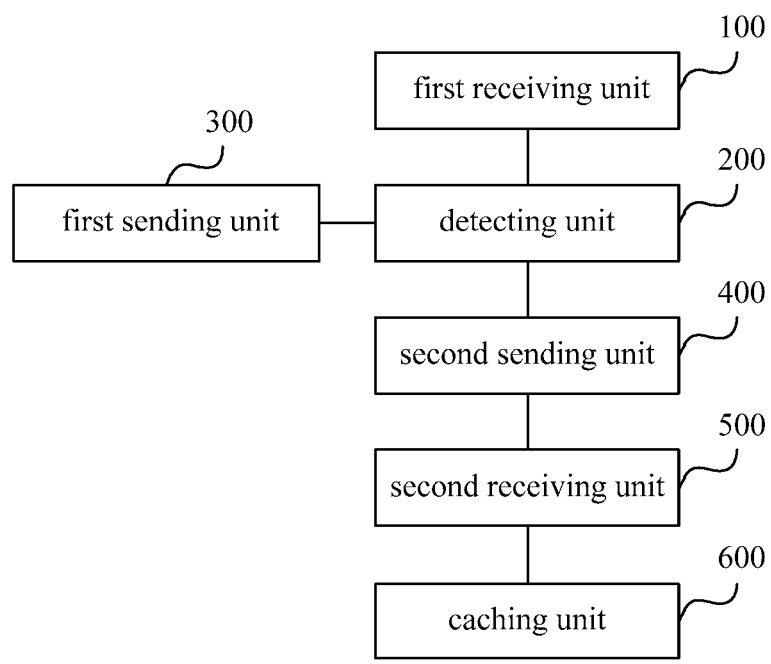
FIG. 5 is a schematic structural diagram of an information acquiring device provided by an example of the present disclosure.

Referring to FIG. 5, FIG. 5 is a schematic structural diagram of an information acquiring device provided in an example of the present disclosure, applicable to a primary proxy server, the device comprises:

a first receiving unit 100 to receive an information acquiring request sent by a first virtual machine, wherein the information acquiring request contains an identifier of the first virtual machine;

a detecting unit 200 to detect whether locally cached configuration information contains first configuration information corresponding to the identifier of the first virtual machine;

a first sending unit 300 to locally acquire the first configuration information and sending the first configuration information to the first virtual machine when it is detected that the locally cached configuration information contains the first configuration information corresponding to the identifier of the first virtual machine;

a second sending unit 400 to send, to a secondary proxy server, the information acquiring request after primary information is added to the information acquiring request, when it is detected that the locally cached configuration information does not contain the first configuration information corresponding to the identifier of the first virtual machine;

a second receiving unit 500 to receive the first configuration information fed back by the secondary proxy server according to the identifier of the first virtual machine and the primary information;

a caching unit 600 to cache the received first configuration information and sending the received first configuration information to the first virtual machine.

In an example, the identifier of the first virtual machine is a source network protocol IP address of the first virtual machine.

The detecting unit 200 is specifically to detect whether the source IP address is locally cached; if so, it is determined that the first configuration information corresponding to the identifier of the first virtual machine is locally cached.

In an example, the second receiving unit 500 is further to receive a second update notification sent by the secondary proxy server after the secondary proxy server receives a first update notification sent by an interface server.

The second sending unit 400 is further to determine first to-be-updated configuration information according to the second update notification, and send an identifier of the first to-be-updated configuration information to the secondary proxy server.

The second receiving unit 500 is further to receive first target configuration information fed back by the secondary proxy server according to the identifier of the first to-be-updated configuration information.

In this case, the information acquiring device may further include:

an update unit (not shown in FIG. 5) to update the first to-be-updated configuration information with the first target configuration information.

In an example, the second sending unit 400 may be specifically to:

determine, if the second update notification does not contain an identifier of second target configuration information, all the locally cached configuration information as the first to-be-updated configuration information;

determine, if the second update notification contains the identifier of the second target configuration information, the locally cached configuration information corresponding to the identifier of the second target configuration information as the first to-be-updated configuration information.

In an example, the second receiving unit 500 may be further to receive a third update notification sent by the secondary proxy server after the secondary proxy server receives a first update notification sent by an interface server; the third update notification comprising second target configuration information.

In this case, the information acquiring device described above may further include:

a determining unit (not shown in FIG. 5) to determine the locally cached configuration information corresponding to an identifier of the second target configuration information contained in the second target configuration information as second to-be-updated configuration information;

an update unit (not shown in FIG. 5) to update the second to-be-updated configuration information with the second target configuration information.

With the example shown in FIG. 5, the primary proxy server may cache configuration information in the process of requesting the configuration information by a virtual machine, and the secondary proxy server pre-caches the configuration information of all virtual machines corresponding to the secondary proxy server. When the primary proxy server receives the information acquiring request sent by the first virtual machine, the primary proxy server detects whether the locally cached configuration information contains first configuration information corresponding to the identifier of the first virtual machine, and if so, the first configuration information may be acquired locally and the information acquiring request may be responded with the first configuration information; if not, the information acquiring request with the added primary information is sent to the secondary proxy server; the secondary proxy server locally acquires the first configuration information according to the information acquiring request, and responds to the information acquiring request. Thus, the path for acquiring configuration information by a virtual machine is cut off at the secondary proxy server and does not arrive at the interface server, which reduces system resources consumed when the virtual machine acquires the configuration information.

Figure 6:
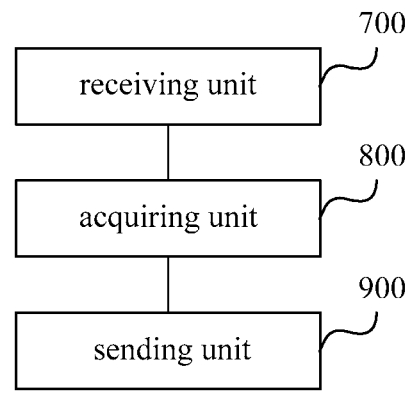
FIG. 6 is a schematic structural diagram of another information acquiring device provided by an example of the present disclosure.

Referring to FIG. 6, FIG. 6 is a schematic structural diagram of another information acquiring device provided in an example of the present disclosure, applicable to a secondary proxy server, wherein configuration information of a virtual machine corresponding to the secondary proxy server is cached in the secondary proxy server, the device comprising:

a receiving unit 700 to receive an information acquiring request sent by a first virtual machine through a primary proxy server, the information acquiring request comprising: an identifier of the first virtual machine and primary information added by the primary proxy server;

an acquiring unit 800 to extract the primary information from the information acquiring request and locally acquiring first configuration information according to the identifier of the identifier of the first virtual machine and the primary information;

a sending unit 900 to send the first configuration information to the primary proxy server, such that the primary proxy server caches the first configuration information and sends the first configuration information to the first virtual machine.

In an example, the receiving unit 700 may be further to receive a first update notification sent by an interface server;

the sending unit 900 may be further to determine third to-be-updated configuration information according to the first update notification and send an identifier of the third to-be-updated configuration information to the interface server;

the receiving unit 700 may be further to receive third target configuration information fed back by the interface server according to the identifier of the third to-be-updated configuration information.

In this case, the information acquiring device described above may further include:

an update unit (not shown in FIG. 6) to update the third to-be-updated configuration information with the third target configuration information.

In an example, the sending unit 900 may be specifically to:

determine, if the first update notification does not contain an identifier of fourth target configuration information, all locally cached configuration information as the third to-be-updated configuration information;

determine, if the first update notification contains the identifier of the fourth target configuration information, the locally cached configuration information corresponding to the identifier of the fourth target configuration information as the third to-be-updated configuration information.

In an example, the sending unit 900 may be further to send a second update notification to the primary proxy server after the third to-be-updated configuration information is updated with the third configuration information;

the receiving unit 700 may be further to receive an identifier of first to-be-updated configuration information which is sent by the primary proxy server according to the second update notification;

the sending unit 900 may be further to feed first target configuration information back to the primary proxy server according to the identifier of the first to-be-updated configuration information, such that the primary proxy server updates the first to-be-updated configuration information with the first target configuration information.

In an example, the information acquiring device described above may further include:

a determining unit (not shown in FIG. 6) which may be to determine, after the third to-be-updated configuration information is updated with the third configuration information, second target configuration information corresponding to the primary proxy server from the third target configuration information according to pre-stored corresponding relation between a proxy server and configuration information;

the sending unit 900 may be further to send a third update notification carrying the second target configuration information to the primary proxy server, such that the primary proxy server determines locally cached configuration information corresponding to the identifier of the second target configuration information contained in the second target configuration information as second to-be-updated configuration information, and updates the second to-be-updated configuration information with the second target configuration information.

With the example shown in FIG. 6, the primary proxy server may cache configuration information in the process of requesting the configuration information by a virtual machine, and the secondary proxy server pre-caches the configuration information of all virtual machines corresponding to the secondary proxy server. When the primary proxy server receives the information acquiring request sent by the first virtual machine, the primary proxy server detects whether the locally cached configuration information contains first configuration information corresponding to the identifier of the first virtual machine, and if so, the first configuration information may be acquired locally and the information acquiring request may be responded with the first configuration information; if not, the information acquiring request with the added primary information is sent to the secondary proxy server; the secondary proxy server locally acquires the first configuration information according to the information acquiring request, and responds to the information acquiring request. Thus, the path for acquiring configuration information by a virtual machine is cut off at the secondary proxy server and does not arrive at the interface server, which reduces system resources consumed when the virtual machine acquires the configuration information.

For the examples of a device, since they are substantially similar with the examples of a method, the description thereof is relatively simple and the relevant part may refer to the part of the examples of a method.

Figure 7:
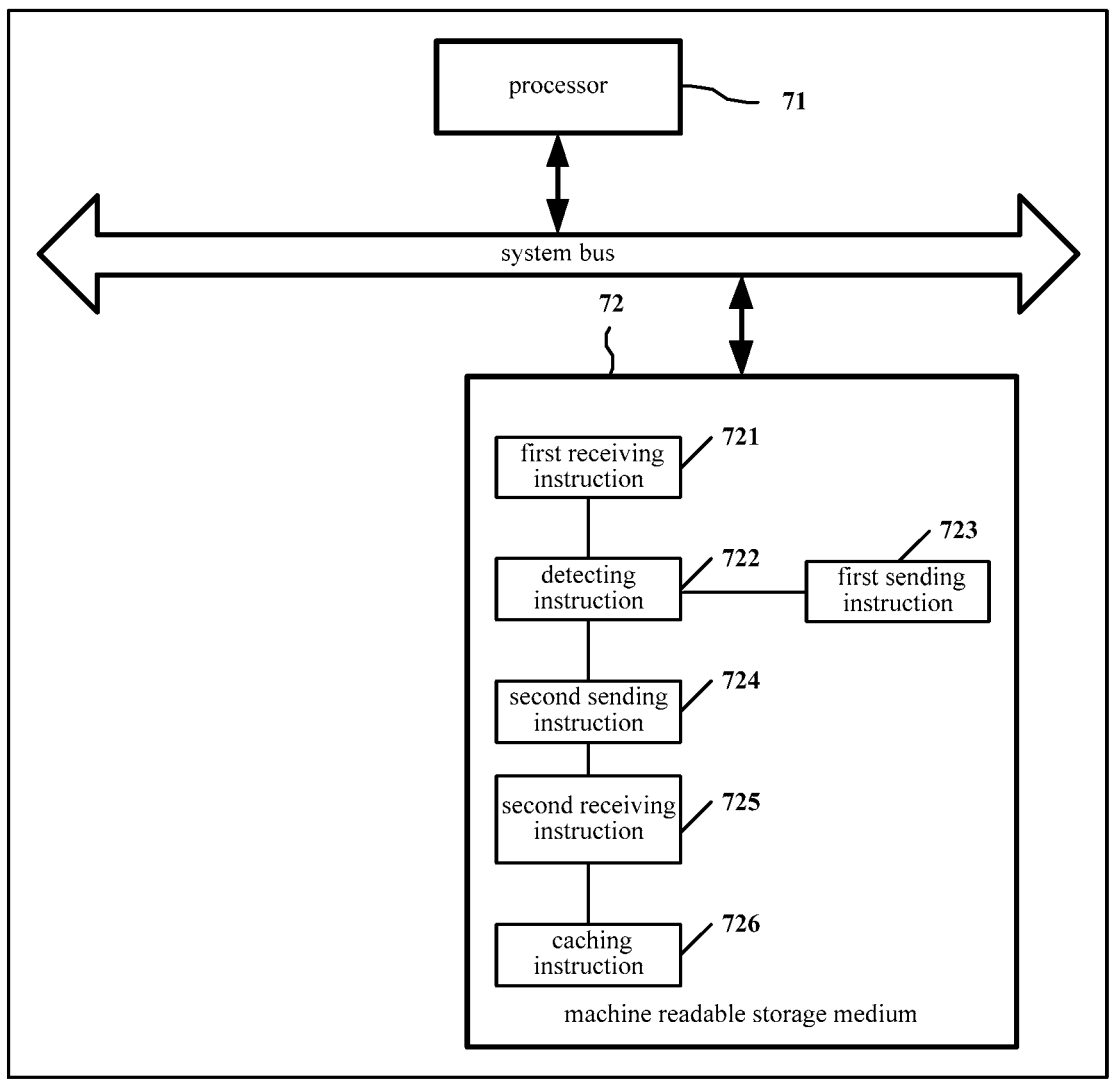
FIG. 7 is a schematic structural diagram of a proxy server provided by an example of the present disclosure.

Corresponding to the above-described examples of a method, examples of the present disclosure also provides a proxy server, which is a primary proxy server, as shown in FIG. 7, including a processor 71 and a machine readable storage medium 72, the machine readable storage medium 72 stores machine executable instructions that may be executed by the processor 71, the machine executable instructions include a first receiving instruction 721, a detecting instruction 722, a first sending instruction 723, a second sending instruction 724, a second receiving instruction 725 and a caching instruction 726. The processor 71 and the machine readable storage medium 72 may communicate via a system bus 73.

The first receiving instruction 721 is executed by the processor 71 to receive an information acquiring request sent by a first virtual machine; wherein the information acquiring request contains an identifier of the first virtual machine;

the detecting instruction 722 is executed by the processor 71 to detect whether locally cached configuration information contains first configuration information corresponding to the identifier of the first virtual machine;

the first sending instruction 723 is executed by the processor 71 to, when it is detected that the locally cached configuration information contains the first configuration information corresponding to the identifier of the first virtual machine, locally acquire the first configuration information and sending the first configuration information to the first virtual machine;

the second sending instruction 724 is executed by the processor 71 to, when it is detected that the locally cached configuration information does not contain first configuration information corresponding to the identifier of the first virtual machine, add primary information to the information acquiring request, and send the information acquiring request with the added primary information to a secondary proxy server;

the second receiving instruction 725 is executed by the processor 71 to receive first configuration information which is fed back by the secondary proxy server according to the identifier of the first virtual machine and the primary information;

the caching instruction 726 is executed by the processor 71 to cache the received first configuration information and send the received first configuration information to the first virtual machine.

Further, the identifier of the first virtual machine is a source network protocol IP address of the first virtual machine.

The detecting instruction 722 is executed by the processor 71 to specifically detect whether a source IP address is locally cached; if so, it is determined that first configuration information corresponding to the identifier of the first virtual machine is locally cached.

The second receiving instruction 725 is executed by the processor 71 to further receive a second update notification sent by the secondary proxy server after the secondary proxy server receives a first update notification sent by an interface server.

The second sending instruction 724 is executed by the processor 71 to further determine first to-be-updated configuration information according to the second update notification, and send an identifier of the first to-be-updated configuration information to the secondary proxy server.

The second receiving instruction 725 is executed by the processor 71 to further receive first target configuration information fed back by the secondary proxy server according to the identifier of the first to-be-updated configuration information.

The machine executable instructions further include an update instruction (not shown in FIG. 7).

The update instruction is executed by the processor 71 to update the first to-be-updated configuration information with the first target configuration information.

Further, the second sending instruction 724 is executed by the processor 71 to further:

determine, if the second update notification does not contain an identifier of second target configuration information, all the locally cached configuration information as the first to-be-updated configuration information;

determine, if the second update notification contains an identifier of second target configuration information, the locally cached configuration information corresponding to the identifier of the second target configuration information as the first to-be-updated configuration information.

Further, the second receiving instruction 725 is executed by the processor 71 to further receive a third update notification sent by the secondary proxy server after the secondary proxy server receives a first update notification sent by an interface server; wherein the third update notification contains: second target configuration information.

The machine executable instructions further include: a determining instruction and an update instruction (not shown in FIG. 7).

The determining instruction is executed by the processor 71 to determine the locally cached configuration information corresponding to an identifier of the second target configuration information contained in the second target configuration information as second to-be-updated configuration information;

the update instruction is executed by the processor 71 to update the second to-be-updated configuration information with the second target configuration information.

Figure 8:
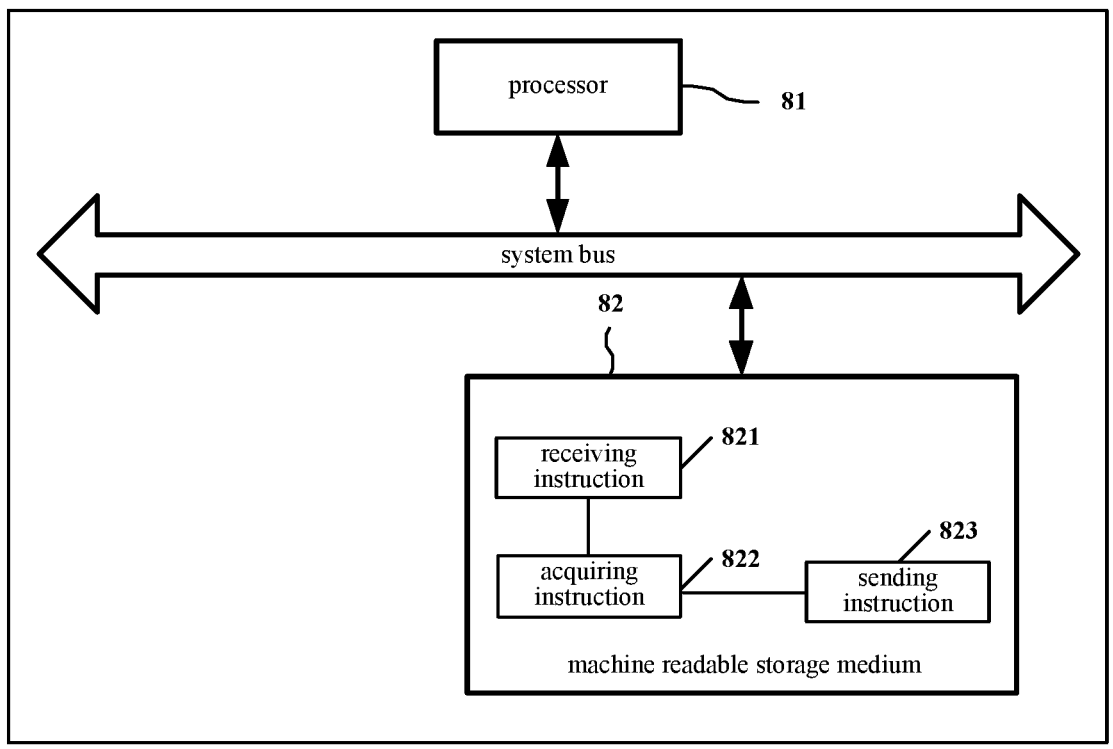
FIG. 8 is a schematic structural diagram of another proxy server provided by an example of the present disclosure.

Corresponding to the above-described examples of a method, examples of the present disclosure further provide a proxy server, which is a secondary proxy server, configuration information of a virtual machine corresponding to the secondary proxy server is cached in the secondary proxy server, as shown in FIG. 8, the proxy server includes a processor 81 and a machine readable storage medium 82 which stores machine executable instructions that may be executed by the processor 81, the machine executable instructions including a receiving instruction 821, an acquiring instruction 822, and a sending instruction 823. The processor 81 and the machine readable storage medium 82 may communicate via a system bus 83.

The receiving instruction 821 is executed by the processor 81 to receive an information acquiring request sent by a first virtual machine through a primary proxy server, the information acquiring request comprising: an identifier of the first virtual machine and primary information added by the primary proxy server;

the acquiring instruction 822 is executed by the processor 81 to extract the primary information from the information acquiring request, and locally acquire first configuration information according to the identifier of the first virtual machine and the primary information;

the sending instruction 823 is executed by the processor 81 to send the first configuration information to the primary proxy server, such that the primary proxy server caches the first configuration information and sends the first configuration information to the first virtual machine.

Further, the receiving instruction 821 is executed by the processor 81 to receive a first update notification sent by an interface server;

the sending instruction 823 is executed by the processor 81 to determine third to-be-updated configuration information according to the first update notification and send an identifier of the third to-be-updated configuration information to the interface server;

the receiving instruction 821 is executed by the processor 81 to receive third target configuration information which is fed back by the interface server according to the identifier of the third to-be-updated configuration information.

The machine executable instructions also include an update instruction (not shown in FIG. 8);

the update instruction is executed by the processor 81 to update the third to-be-updated configuration information with the third target configuration information.

Further, the sending instruction 823 is executed by the processor 81 specifically to:

determine, if the first update notification does not contain an identifier of fourth target configuration information, all the locally cached configuration information as the third to-be-updated configuration information;

determine, if the first update notification contains an identifier of fourth target configuration information, the locally cached configuration information corresponding to the identifier of the fourth target configuration information as the third to-be-updated configuration information.

Further, the sending instruction 823 is executed by the processor 81 to specifically send a second update notification to the primary proxy server after the third to-be-updated configuration information is updated with the third configuration information;

the receiving instruction 821 is executed by the processor 81 to receive an identifier of first to-be-updated configuration information which is sent by the primary proxy server according to the second update notification;

the sending instruction 823 is executed by the processor 81 to feed first target configuration information back to the primary proxy server according to the identifier of the first to-be-updated configuration information, such that the primary proxy server updates the first to-be-updated configuration information with the first target configuration information.

Further, the machine executable instructions further include a determining instruction (not shown in FIG. 8);

the determining instruction is executed by the processor 81 to determine, after the third to-be-updated configuration information is updated with the third target configuration information, second target configuration information corresponding to the primary proxy server from the third target configuration information according to pre-stored corresponding relation between a proxy server and configuration information;

the sending instruction 823 is executed by the processor 81 to send a third update notification carrying the second target configuration information to the primary proxy server, such that the primary proxy server determines locally cached configuration information corresponding to the identifier of the second target configuration information contained in the second target configuration information as second to-be-updated configuration information, and updates the second to-be-updated configuration information with the second target configuration information.

Corresponding to the above-described examples of a method, examples of the present disclosure further provide a computer readable storage medium storing a machine executable instruction that, when called and executed by a processor, promotes the processor to realize the information acquiring method applied to a primary proxy server in the above-described examples.

Corresponding to the above-described examples of a method, examples of the present disclosure further provide a computer readable storage medium storing a machine executable instruction that, when called and executed by a processor, promotes the processor to realize the information acquiring method applied to a secondary proxy server in the above-described examples.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover a non-exclusive inclusion, such that processes, methods, articles, or devices comprising a series of elements comprise not only those elements listed but also those not specifically listed or the elements intrinsic to these processes, methods, articles, or equipment. Without further limitations, elements defined by the sentences "comprise(s) a . . . " or "include(s) a . . . " do not exclude that there are other identical elements in the processes, methods, articles, or devices which comprise these elements.

It will be understood by those of ordinary skill in the art that all or some of the steps in the method described above may be accomplished by a program to instruct the associated hardware. Said program may be stored in a computer-readable storage medium, such as ROM/RAM, magnetic disks, optical disks, etc.

Examples described above are just some examples of the present disclosure, and not intended to limit the protection scope of the present disclosure. Any modifications, equivalent, improvement or the like within the spirit and principle of the present disclosure should be included in the protection scope of the present disclosure.

What is claimed is:

1. An information acquiring method, applicable to a primary proxy server, wherein the method comprises:

receiving an information acquiring request sent by a first virtual machine, wherein the information acquiring request contains an identifier of the first virtual machine;

detecting whether locally cached configuration information contains first configuration information corresponding to the identifier of the first virtual machine;

if so, locally acquiring the first configuration information and sending the first configuration information to the first virtual machine;

otherwise, adding primary information to the information acquiring request, and sending the information acquiring request with the added primary information to a secondary proxy server; receiving the first configuration information fed back by the secondary proxy server according to the identifier of the first virtual machine and the primary information;

caching the received first configuration information and sending the received first configuration information to the first virtual machine;

receiving a second update notification sent by the secondary proxy server after the secondary proxy server receives a first update notification sent by an interface server, wherein the first update notification indicates change of configuration information in the interface server, and the second update notification indicates change of configuration information cached in the secondary proxy server;

determining first to-be-updated configuration information according to the second update notification and sending an identifier of the first to-be-updated configuration information to the secondary proxy server, wherein the first to-be-updated configuration information is configuration information that is cached in the primary proxy server and needs to be updated;

receiving first target configuration information which is fed back by the secondary proxy server according to the identifier of the first to-be-updated configuration information; and updating the determined first to-be-updated configuration information with the first target configuration information.

2. The method of claim 1, wherein determining the first to-be-updated configuration information according to the second update notification comprises:

if the second update notification does not contain an identifier of second target configuration information, determining all the locally cached configuration information as the first to-be-updated configuration information; or if the second update notification contains an identifier of second target configuration information, determining the locally cached configuration information corresponding to the identifier of the second target configuration information as the first to-be-updated configuration information.

3. The method of claim 1, wherein the method further comprises:
receiving a third update notification sent by the secondary proxy server after the secondary proxy server receives a first update notification sent by an interface server, the third update notification comprising second target configuration information;
determining the locally cached configuration information corresponding to an identifier of the second target configuration information contained in the second target configuration information as second to-be-updated configuration information; and
updating the determined second to-be-updated configuration information with the second target configuration information.

4. An information acquiring method, applicable to a secondary proxy server, wherein configuration information of a virtual machine corresponding to the secondary proxy server is cached in the secondary proxy server, wherein the method comprises:
receiving an information acquiring request sent by a first virtual machine through a primary proxy server; wherein the information acquiring request contains: an identifier of the first virtual machine, and primary information added by the primary proxy server;
extracting the primary information from the information acquiring request, and locally acquiring first configuration information according to the identifier of the first virtual machine and the primary information;
sending the first configuration information to the primary proxy server, such that the primary proxy server caches the first configuration information and sends the first configuration information to the first virtual machine;
receiving a first update notification sent by an interface server, wherein the first update notification indicates change of configuration information in the interface server;
determining third to-be-updated configuration information according to the first update notification and sending an identifier of the third to-be-updated configuration information to the interface server;
receiving third target configuration information which is fed back by the interface server according to the identifier of the third to-be-updated configuration information; and
updating the determined third to-be-updated configuration information with the third target configuration information.

5. The method of claim 4, wherein determining the third to-be-updated configuration information according to the first update notification comprises:
if the first update notification does not contain an identifier of fourth target configuration information, determining all locally cached configuration information as the third to-be-updated configuration information; or
if the first update notification contains an identifier of fourth target configuration information, determining the locally cached configuration information corresponding to the identifier of the fourth target configuration information as the third to-be-updated configuration information.

6. The method of claim 4, wherein after updating the determined third to-be-updated configuration information with the third target configuration information, the method further comprises:
sending a second update notification to the primary proxy server;
receiving an identifier of first to-be-updated configuration information which is sent by the primary proxy server according to the second update notification; and
feeding back first target configuration information to the primary proxy server according to the identifier of the first to-be-updated configuration information, such that the primary proxy server updates the first to-be-updated configuration information with the first target configuration information.

7. The method of claim 4, wherein after updating the determined third to-be-updated configuration information with the third target configuration information, the method further comprises:
determining second target configuration information corresponding to the primary proxy server from the third target configuration information according to a pre-stored corresponding relation between a proxy server and configuration information; and
sending a third update notification carrying the second target configuration information to the primary proxy server, such that the primary proxy server determines locally cached configuration information corresponding to the identifier of the second target configuration information contained in the second target configuration information as second to-be-updated configuration information, and updating the determined second to-be-updated configuration information with the second target configuration information.

8. A proxy server, which is a primary proxy server, comprising: a processor and a machine readable storage medium storing machine executable instructions that can be executed by the processor, the machine executable instructions comprising: a first receiving instruction, a detecting instruction, a first sending instruction, a second sending instruction, a second receiving instruction, and a caching instruction;
the first receiving instruction is executed by the processor to receive an information acquiring request sent by a first virtual machine; wherein the information acquiring request contains an identifier of the first virtual machine;
the detecting instruction is executed by the processor to detect whether locally cached configuration information contains first configuration information corresponding to the identifier of the first virtual machine;
the first sending instruction is executed by the processor to, when it is detected that the locally cached configuration information contains the first configuration information corresponding to the identifier of the first virtual machine, locally acquire the first configuration information and send the first configuration information to the first virtual machine;
the second sending instruction is executed by the processor to, when it is detected that the locally cached configuration information does not contain first configuration information corresponding to the identifier of the first virtual machine, add primary information to the information acquiring request, and send the information acquiring request with added the primary information to a secondary proxy server;

the second receiving instruction is executed by the processor to receive first configuration information which is fed back by the secondary proxy server according to the identifier of the first virtual machine and the primary information;

the caching instruction is executed by the processor to cache the received first configuration information and send the received first configuration information to the first virtual machine;

wherein the second receiving instruction is executed by the processor to further receive a second update notification sent by the secondary proxy server after the secondary proxy server receives a first update notification sent by an interface server, wherein the first update notification indicates change of configuration information in the interface server, and the second update notification indicates change of configuration information cached in the secondary proxy server;

the second sending instruction is executed by the processor to further determine first to-be-updated configuration information according to the second update notification, and send an identifier of the first to-be-updated configuration information to the secondary proxy server, wherein the first to-be-updated configuration information is configuration information that is cached in the primary proxy server and needs to be updated;

the second receiving instruction is executed by the processor to further receive first target configuration information fed back by the secondary proxy server according to the identifier of the first to-be-updated configuration information;

the machine executable instructions further include an update instruction; and the update instruction is executed by the processor to update the first to-be-updated configuration information with the first target configuration information.

9. The proxy server of claim 8, wherein the second sending instruction is executed by the processor specifically to:

determine, if the second update notification does not contain an identifier of second target configuration information, all the locally cached configuration information as the first to-be-updated configuration information; or determine, if the second update notification contains an identifier of second target configuration information, the locally cached configuration information corresponding to the identifier of the second target configuration information as the first to-be-updated configuration information.

10. The proxy server of claim 8, wherein the second receiving instruction is executed by the processor to further receive a third update notification sent by the secondary proxy server after the secondary proxy server receives a first update notification sent by an interface server; wherein the third update notification contains second target configuration information;

the machine executable instructions further include a determining instruction and an update instruction;

the determining instruction is executed by the processor to determine the locally cached configuration information corresponding to an identifier of the second target configuration information contained in the second target configuration information as second to-be-updated configuration information; and the update instruction is executed by the processor to update the second to-be-updated configuration information with the second target configuration information.

11. A proxy server, which is a secondary proxy server, wherein configuration information of a virtual machine corresponding to the secondary proxy server is cached in the secondary proxy server, the proxy server comprising: a processor and a machine readable storage medium, the machine readable storage medium storing machine executable instructions that can be executed by the processor, the machine executable instructions comprising: a receiving instruction, an acquiring instruction, and a sending instruction;

the receiving instruction is executed by the processor to receive an information acquiring request sent by a first virtual machine through a primary proxy server, wherein the information acquiring request comprises: an identifier of the first virtual machine, and primary information added by the primary proxy server;

the acquiring instruction is executed by the processor to extract the primary information from the information acquiring request, and locally acquire first configuration information according to the identifier of the first virtual machine and the primary information;

the sending instruction is executed by the processor to send the first configuration information to the primary proxy server, such that the primary proxy server caches the first configuration information and sends the first configuration information to the first virtual machine;

wherein the receiving instruction is further executed by the processor to receive a first update notification sent by an interface server, wherein the first update notification indicates change of configuration information in the interface server;

the sending instruction is executed by the processor to further determine third to-be-updated configuration information according to the first update notification and send an identifier of the third to-be-updated configuration information to the interface server;

the receiving instruction is executed by the processor to further receive third target configuration information fed back by the interface server according to the identifier of the third to-be-updated configuration information; and the machine executable instructions also include an update instruction;

the update instruction is executed by the processor to further update the third to-be-updated configuration information with the third target configuration information.

12. The proxy server of claim 11, wherein the sending instruction is further executed by the processor specifically to:

determine, if the first update notification does not contain an identifier of fourth target configuration information, all the locally cached configuration information as the third to-be-updated configuration information; or determine, if the first update notification contains an identifier of fourth target configuration information, the locally cached configuration information corresponding to the identifier of the fourth target configuration information as the third to-be-updated configuration information.

13. The proxy server of claim 11, wherein the sending instruction is executed by the processor to further send a second update notification to the primary proxy server after the third to-be-updated configuration information is updated with the third target configuration information;

the receiving instruction is executed by the processor to further receive an identifier of first to-be-updated configuration information which is sent by the primary proxy server according to the second update notification; and the sending instruction is executed by the processor to further feed back first target configuration information to the primary proxy server according to the identifier of the first to-be-updated configuration information, such that the primary proxy server updates the first to-be-updated configuration information with the first target configuration information.

14. The proxy server of claim 11, wherein the machine executable instructions further include a determining instruction;

the determining instruction is executed by the processor to determine, after the third to-be-updated configuration information is updated with the third target configuration information, second target configuration information corresponding to the primary proxy server from the third target configuration information according to a pre-stored corresponding relation between a proxy server and configuration information; and the sending instruction is executed by the processor to further send a third update notification carrying the second target configuration information to the primary proxy server, such that the primary proxy server determines locally cached configuration information corresponding to the identifier of the second target configuration information contained in the second target configuration information as second to-be-updated configuration information, and updates the second to-be-updated configuration information with the second target configuration information.

* * * * *